(12) United States Patent
Hasegawa

(10) Patent No.: US 10,361,608 B2
(45) Date of Patent: Jul. 23, 2019

(54) MECHANICALLY-ELECTRICALLY INTEGRATED ELECTRICAL ROTATING APPARATUS WITH HIGH COOLING PERFORMANCE

(71) Applicant: NISSAN MOTOR CO., LTD., Yokohama-shi, Kanagawa (JP)

(72) Inventor: Kazuhiro Hasegawa, Kanagawa (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 0 days.

(21) Appl. No.: 15/576,397

(22) PCT Filed: May 26, 2015

(86) PCT No.: PCT/JP2015/065116
§ 371 (c)(1),
(2) Date: Nov. 22, 2017

(87) PCT Pub. No.: WO2016/189658
PCT Pub. Date: Dec. 1, 2016

(65) Prior Publication Data
US 2018/0152079 A1     May 31, 2018

(51) Int. Cl.
*H02K 9/19*     (2006.01)
*H02K 5/20*     (2006.01)
(Continued)

(52) U.S. Cl.
CPC .............. *H02K 9/19* (2013.01); *H02K 5/20* (2013.01); *H02K 11/00* (2013.01); *H02K 11/27* (2016.01);
(Continued)

(58) Field of Classification Search
CPC .......... H02K 9/19; H02K 9/193; H02K 9/197; H02K 11/27; H02K 11/33; H02K 11/00; H02K 5/20; H02K 5/225; H02K 5/22
(Continued)

(56) References Cited

U.S. PATENT DOCUMENTS 6,198,183 B1 *   3/2001   Baeumel .................. H02K 9/19
                                                        310/54
7,102,260 B2    9/2006   Takenaka et al.
(Continued)

FOREIGN PATENT DOCUMENTS

CN       1615570 A     5/2005
CN     104426454 A     3/2015
(Continued)

OTHER PUBLICATIONS

Machine translation of JP 2013233052 A (Nov. 2013).*

*Primary Examiner* — Michael Andrews
(74) *Attorney, Agent, or Firm* — Foley & Lardner LLP

(57) ABSTRACT

It includes an electrical rotating device, an electric power conversion device connected with the electrical rotating device, a housing that integrally houses the electrical rotating device and the electric power conversion device, and an attachment member that is attached to the housing, the electric power conversion device being attached thereto on an opposite side to the electrical rotating device. An electrically conductive connecting member connected with an electronic component that configures the electric power conversion device is attached to the attachment member in an electrically insulated state from the attachment member on an opposite side of the attachment member to the electrical rotating device. A cooling portion that cools the electronic component and the electrically conductive con-
(Continued)

necting member is provided on the attachment member on a side of the electrical rotating device.

15 Claims, 5 Drawing Sheets

(51) Int. Cl.
H02M 7/48 (2007.01)
H02K 11/00 (2016.01)
H02K 11/33 (2016.01)
H02K 11/27 (2016.01)
H02K 5/22 (2006.01)

(52) U.S. Cl.
CPC .............. *H02K 11/33* (2016.01); *H02M 7/48* (2013.01); *H02K 5/225* (2013.01)

(58) Field of Classification Search
USPC .............................................. 310/54, 58, 59
See application file for complete search history.

(56) References Cited

U.S. PATENT DOCUMENTS

| 9,231,446 | B2 | 1/2016 | Soma et al. |
| 9,881,019 | B2 | 1/2018 | Matsuo |
| 2005/0168081 | A1 | 8/2005 | Takenaka et al. |
| 2005/0253465 | A1* | 11/2005 | Takenaka ................. H02K 5/20 310/52 |
| 2013/0010426 | A1 | 1/2013 | Nakano et al. |
| 2013/0049495 | A1 | 2/2013 | Matsuo |
| 2013/0241458 | A1 | 9/2013 | Soma et al. |
| 2014/0202781 | A1 | 7/2014 | Soma et al. |
| 2015/0061423 | A1 | 3/2015 | Nagao et al. |
| 2015/0199376 | A1 | 7/2015 | Matsuo |

FOREIGN PATENT DOCUMENTS

| EP | 2 639 945 A2 | 9/2013 | |
| EP | 2 763 291 A1 | 8/2014 | |
| JP | 2005-36773 A | 2/2005 | |
| JP | 2005-168133 A | 6/2005 | |
| JP | 2005-237141 A | 9/2005 | |
| JP | 2010-124607 A | 6/2010 | |
| JP | 2011-182480 A | 9/2011 | |
| JP | 2011-223744 A | 11/2011 | |
| JP | 2013-106473 A | 5/2013 | |
| JP | 2013-162017 | 8/2013 | |
| JP | 2013-192367 A | 9/2013 | |
| JP | 2013-192374 A | 9/2013 | |
| JP | 2013-233052 A | 11/2013 | |
| JP | 2013233052 A | * 11/2013 | ............... H02K 5/22 |
| JP | 2016-096663 A | 5/2016 | |
| KR | 10-2012-0006309 A | 1/2012 | |

* cited by examiner

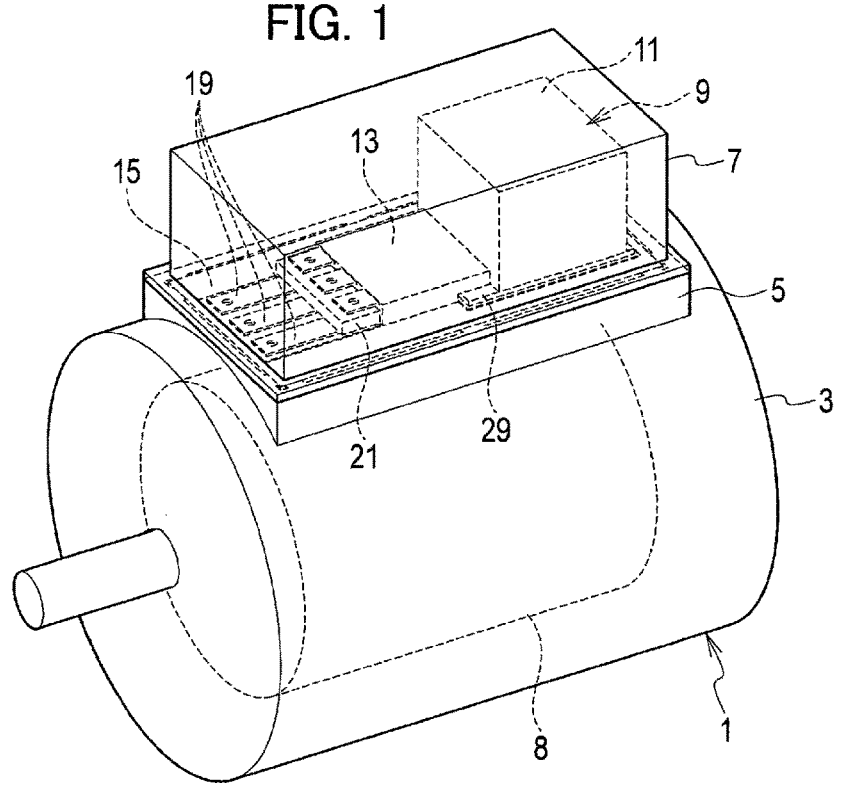
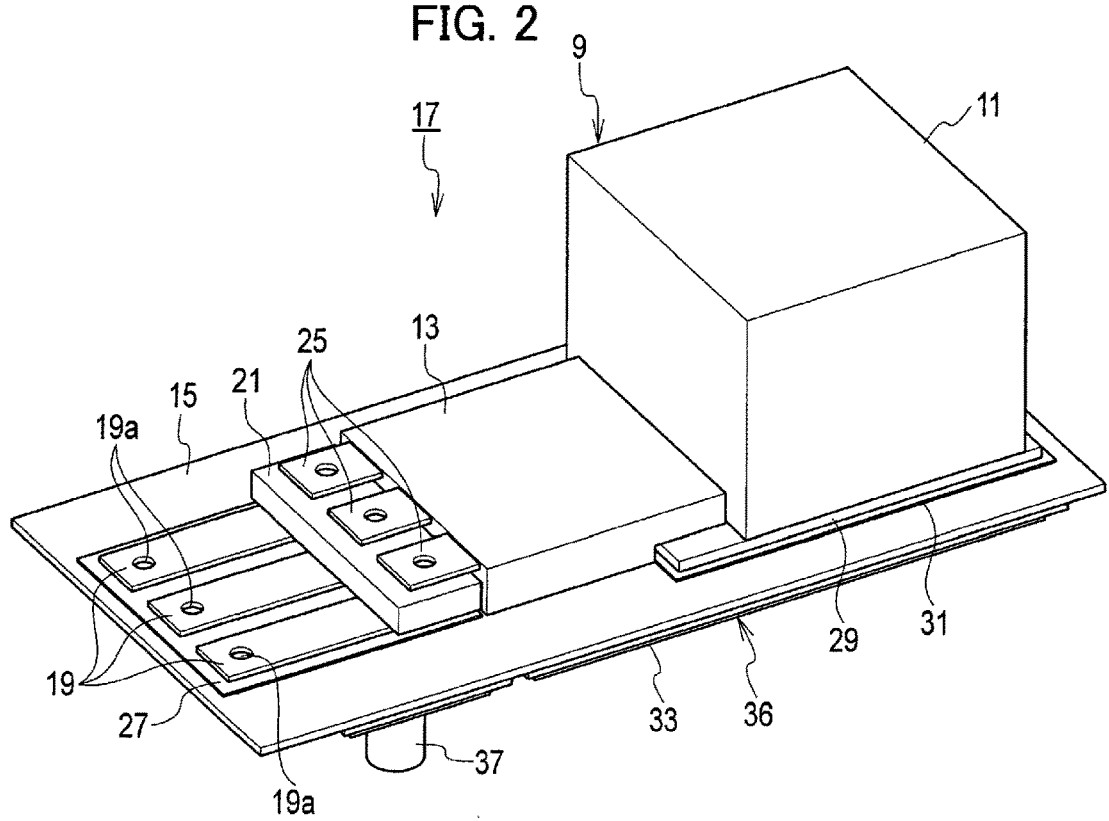

MECHANICALLY-ELECTRICALLY INTEGRATED ELECTRICAL ROTATING APPARATUS WITH HIGH COOLING PERFORMANCE

TECHNICAL FIELD

The present invention relates to a mechanically-electrically integrated electrical rotating apparatus in which an electrical rotating device and an electric power conversion device are integrally housed in its housing.

BACKGROUND ART

For integrally housing a motor as an electrical rotating device and an inverter as an electric power conversion device in a housing, a configuration is known, in which the inverter is attached onto an attachment base provided in the housing (Patent Literature 1). In order to restrict temperature of the inverter from highly increasing, the housing is cooled by low-temperature refrigerant gas during operations of a compressor and thereby the inverter on the attachment base is cooled by this cryogenic energy, according to technology of the Patent Literature 1.

CITATION LIST

Prior-Art Literature

Patent Literature 1: Japanese Unexamined Patent Application Publication No. 2005-36773

SUMMARY OF INVENTION

Although the inverter on the attachment base is cooled by the cryogenic energy when the housing is cooled in the technology of the Patent Literature 1, it is concerned that temperature of the inverter may increase highly due to transferring of heats generated at a coil of a motor.

Therefore, the present invention intends to restrict high temperature of an electric power conversion device caused by heats generated by an electrical rotating device.

The present invention is a mechanically-electrically integrated electrical rotating apparatus that includes an electrical rotating device, an electric power conversion device, and a housing that houses the electrical rotating device and the electric power conversion device, includes an attachment member to which the electric power conversion device is attached on an opposite side to the electrical rotating device. This electric power conversion device provides an electrically conductive connecting member connected with an electronic component that configures of the electric power conversion device on the attachment member in an electrically insulated state from the attachment member on an opposite side of the attachment member to the electrical rotating device, and further includes a cooling portion that cools the electronic component and the electrically conductive member on the attachment member on a side of the electrical rotating device.

BRIEF DESCRIPTION OF DRAWINGS

FIG. 1 is a perspective view of an electrical rotating apparatus according to a first embodiment of the present invention.

FIG. 2 is a perspective view of an inverter module used in the electrical rotating apparatus in FIG. 1.

DESCRIPTION OF EMBODIMENTS

Figure 3:
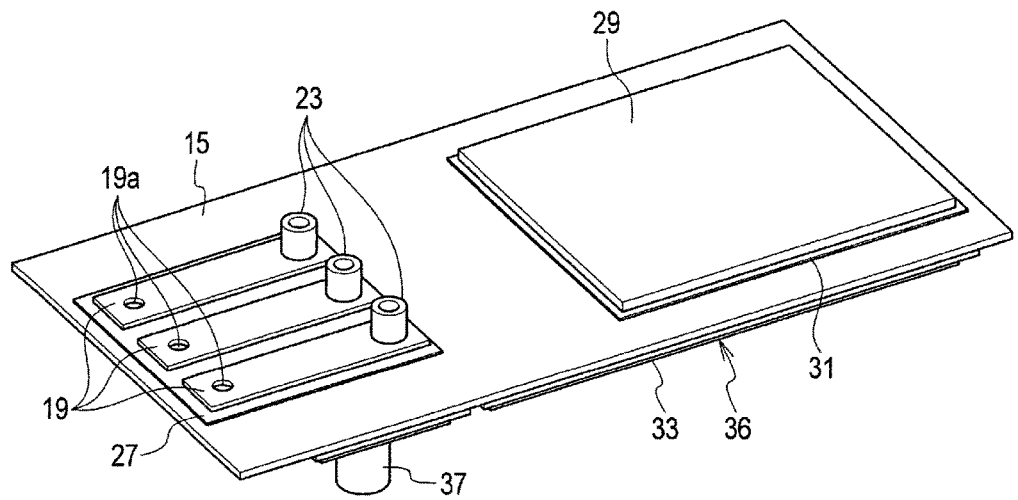
FIG. 3 is a perspective view made by omitting some electrical components from FIG. 2.

Hereinafter, embodiments for carrying out the present invention will be described in detail with reference to the drawings.

FIG. 1 is a perspective view of a mechanically-electrically integrated electrical rotating apparatus according to a first embodiment of the present invention. A housing 1 of the electrical rotating apparatus includes a motor portion 3 having an almost cylindrical shape, an inverter portion 5 having an almost rectangular parallelepiped shape and integrally provided on an upper side, in FIG. 1, of a cylindrically-shaped portion of the motor portion 3, and a cover 7 covering over an upper portion of the inverter portion 5.

A three-phase AC motor (hereinafter, merely called as the motor) 8 as an electrical rotating device is housed in the motor portion 3. An inverter 9 as an electric power conversion device is housed in a portion, above the inverter portion 5, covered by the cover 7. Namely, the housing 1 integrally houses the motor 8 and the inverter 9.

The inverter 9 includes a smoothing capacitor 11, a power module 13 having power semiconductor elements and so on as electronic components. The inverter 9 is attached onto an upper surface, on an opposite side to the motor 8, of a tray 15 as an attachment member. A rectangular bottom wall is provided at the inverter portion 5 of the housing 1 in order to put the tray 15 thereon and then fix it therewith.

The tray 15 is configured of a rectangular plate member. A material of the tray 15 is metal that is composed of an electrically conductive material, resin or ceramic that is composed of an electrically nonconductive material, or the like. An inverter module 17 as shown in FIG. 2 is configured by mounting the above-mentioned plural electronic components as inverter components on the tray 15.

Three bus bars 19 as electrically conductive connecting members are attached to the tray 15 at positions on an opposite side to the smoothing capacitor 11. The three bus bars 19 configure electric power supply terminals for supplying electric power to the motor 8, and are provided so as to be associated with U, V and W phases of the motor 8, respectively.

An electric current sensor 21 is provided on the bus bars 19 at a position adjacent to the power module 13. As shown in FIG. 3 in which some electronic components are omitted in comparison with FIG. 2, sensor connecting terminals 23 are provided, so as to protrude upward, at ends of the bus bars 19 on a side of the electric current sensor 21, respectively. The electric current sensor 21 is connected with the bus bars 19 via the sensor connecting terminals 23.

The electric current sensor 21 is connected with three terminals 25 led out from the power module 13. According to this, the electric current sensor 21 detects electric currents flowing from the terminals 25 of the power module 13 toward the bus bars 19.

Here, the tray 15 is made of metal that is composed of an electrically conductive material. Therefore, an electrical insulation sheet 27 as an electrically insulating member such as an electrically insulating paper is provided between the metallic tray 15 and the bus bars 19 in order to get electrical insulation. The electrical insulation sheet 27 is formed in an almost square shape to include the whole of the three bus bars 19, and, for example, fixed with the tray 15 and the bus bars 19 by adhesion.

Figure 4:
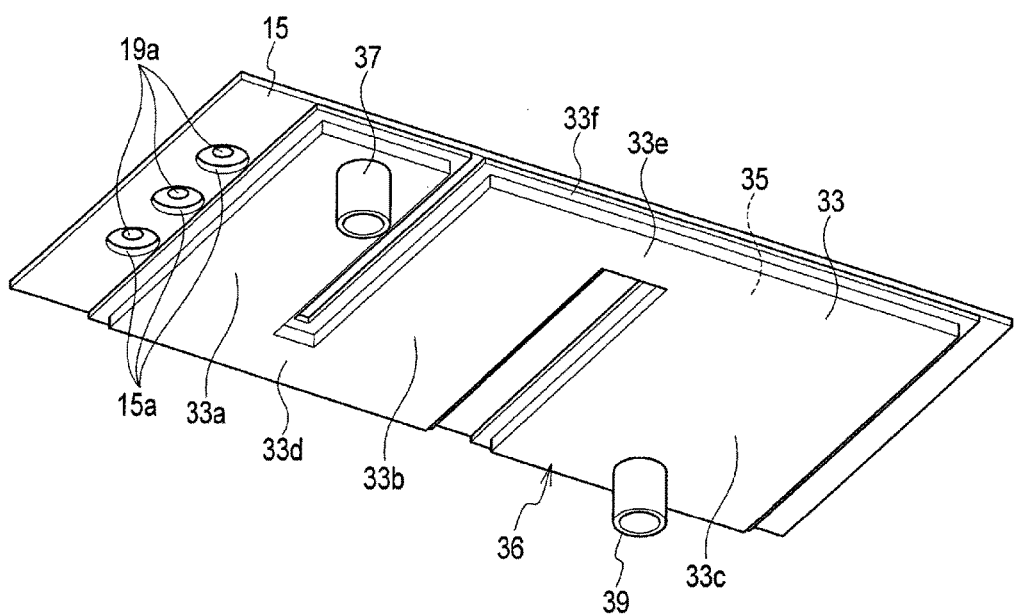
FIG. 4 is a perspective view when viewed from a lower side in FIG. 3.

Terminal holes 19a with which terminal members that are not shown in the drawings are connected and fixed are formed at ends of the bus bars 19 on an opposite side to the electric current sensor 21. The terminal members not shown in the drawings are connected with the motor 8. As shown in FIG. 4, opened holes 15a that are sufficiently larger than the terminal holes 19a are formed at positions, on the tray 15, so as to be associated with the terminal holes 19a. According to this, the terminal members not shown in the drawings and connected with the motor 8 and the metallic tray 15 are distanced from each other so as to be in a non-contacting state. Opened holes whose diameter is almost equal to that of the opened holes 15a are formed on the electrical insulation sheet 27 so as to be associated with the terminal holes 19a.

The smoothing capacitor 11 shown in a rectangular parallelepiped shape is attached onto an electrically conductive plate 29 having a rectangular shape shown in FIG. 3, and an electrical insulation sheet 31 as an electrically insulating member is provided between the electrically conductive plate 29 and the tray 15. The electrical insulation sheet 31 is formed, as a whole, in a rectangular shape slightly larger than that of the electrically conductive plate 29 so that its outer circumferential edge expands outward from an outer circumferential edge of the electrically conductive plate 29. The electrical insulation sheet 31 is fixed with the tray 15 and the electrically conductive plate 29 by adhesion, for example.

As shown in FIG. 2, portions of the electrically conductive plate 29 and the electrical insulation sheet 31 that are protrude from the smoothing capacitor 11 toward the power module 13 are located under a portion of the power module 13. According to this, the smoothing capacitor 11 and the power module 13 are electrically connected with each other via the electrically conductive plate 29.

The power module 13 is fixed on the tray 15 by fasteners, adhesion or the like in a state where its switching elements are molded in resin. A portion of the power module 13 that is associated with the electrically conductive plate 29 doesn't form the resin molded portion, and the portion that doesn't form the resin molded portion is electrically connected with the smoothing capacitor 11.

As shown in FIG. 4, a water channel forming member 33 is contacted and fixed with the tray 15 on a side of the motor 8. The water channel forming member 33 includes an opening portion that opens at its side facing to the tray 15, and a tray cooling water channel 35 is formed between it and the tray 15 by contacting and fixing the opening portion to a surface (bottom surface) of the tray 15 to configure a cooler 36 as a cooling portion.

The water channel forming member 33 includes a first main channel forming portion 33a, a second main channel forming portion 33b, and a third main channel forming portion 33c, each of which is formed parallel to a short side of the rectangular tray 15. The first main channel forming portion 33a and the second main channel forming portion 33b are connected with each other by a first connecting channel forming portion 33d at their ends on one side. The second main channel forming portion 33b and the third main channel forming portion 33c are connected with each other by a second connecting channel forming portion 33e at their ends on the opposite side.

Therefore, the water channel forming member 33 is formed in a serpentine shape. The tray cooling water channel 35 is also formed in a serpentine shape so as to be associated with the shape of the water channel forming member 33. A flange 33f is formed along an entire of a circumferential edge of the serpentine water channel forming member 33. The flange 33f is contacted and fixed with the tray 15 by adhesion or the like in a sealing state.

A cooling water inlet pipe 37 is connected to a vicinity of an end of the first main channel forming portion 33a on an opposite side to the first connecting channel forming portion 33d. On the other hand, a cooling water outlet pipe 39 is connected to a vicinity of an end of the third main channel forming portion 33c on an opposite side to the second connecting channel forming portion 33e.

Cooling water is supplied from outside to the cooling water inlet pipe 37 by a cooling water pump that is not shown in the drawing, and then flows through the tray cooling water channel 35. The cooling water as a cooling medium flows through the tray cooling water channel 35 from the first main channel forming portion 33a toward the third main channel forming portion 33c, and then is discharged from the cooling water outlet pipe 39 to the outside of the cooler 36.

The cooling water discharged to the outside of the cooler 36 cools the motor 8 while passing through a cooling water channel(s) that is not shown in the drawings and provided in a wall of the motor portion 3 of the housing 1. The cooling water that has cooled the motor 8 is discharged to the outside of the housing 1.

An entire of the tray 15 including the water channel forming member 33 may be covered by a laminated film in a state where the smoothing capacitor 11, the power module 13 and the electric current sensor 12 are not yet attached thereto. At that time, the laminated film covers the bus bars 19 and the electrically conductive plate 29 excluding their electrically conductive portions. Further, the laminated film covers the water channel forming member 33 excluding the cooling water inlet pipe 37 and the cooling water outlet pipe 39.

Figure 5:
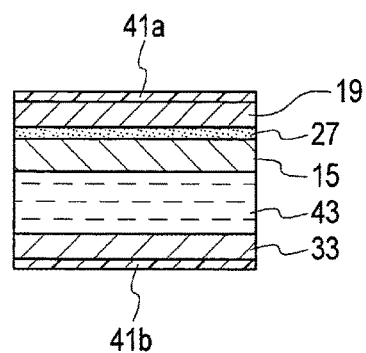
FIG. 5 is a schematically cross-sectional view of a portion having a bus bar in FIG. 3.

FIG. 5 is a schematically cross-sectional view of a portion having the bus bar 19 shown in FIG. 3 in the configuration including the laminated film. In this case, the water channel forming member 33, the cooling water 43, the tray 15, the electrical insulation sheet 27, and the bus bar 19 exist between the upper and lower laminated films 41a and 41b in this order from the lower laminated film 41b.

In the present embodiment, as shown in FIG. 5, the cooling water 43 efficiently cools an entire of the tray 15 by directly contacting with the bottom surface of the tray 15 on the opposite side to the bus bars 19. Since the tray 15 is cooled, the inverter 9 that includes electronic components on the tray 15 such as the bus bars 19, the smoothing capacitor 11 and the power module 13 can be cooled effectively.

In addition, there may be a case where heats generated at a coil of the motor 8 transfer to the inverter 9 (the power module 13) through the bus bars 19. Since the tray 15 is cooled in such a case as explained above, the bus bars 19 are cooled via the electrical insulation sheet 27 and thereby the heats generated at the motor 8 can be restricted from transferring to the inverter 9 (the power module 13). Therefore, temperature of the inverter 9 (the power module 13) can be restricted from highly increasing.

Since the bus bars 19 are cooled and then their temperatures can be restricted from highly increasing, detection errors, caused by the high temperature, of the electric current sensor 21 connected with the bus bars 19 can be restricted and then its output gets stable and detection accuracy of the electric currents is improved. In addition, the temperatures of the bus bars 19 are restricted from highly increasing, so that their electrical resistances can be restricted to be low when the electric currents are applied thereto and thereby reliability can be improved.

In the present embodiment, the tray 15 is made of metal that is an electrically conductive material and the electrical insulation sheet 27 is disposed between the tray 15 and the bus bars 19. Therefore, cooling of the bus bars 19 can be ensured while electrically insulating the tray 15 from the bus bars 19 by the electrical insulation sheet 27. Since the tray 15 is made of metal whose thermal resistance is relatively low, heats of the bus bars 19 can be efficiently radiated to the cooler 36 through the tray 15. In addition, by electrically insulating the tray 15 from the bus bars 19 by use of the electrical insulation sheet 27, the tray 15 can be electrically insulated also from the inverter 9 (the power module 13) easily.

Further in the present embodiment, the water channel forming member 33 includes the opening portion that opens at its side facing to the tray 15, and the opening portion is contacted and fixed with the surface (bottom surface) of the tray 15. A cooling medium storage chamber that storages the cooling medium is formed inside the opening portion. According to this, the cooling medium flowing to the cooling medium storage chamber in the water channel forming member 33 directly cools the tray 15, and thereby the tray 15 can be effectively cooled.

Furthermore in the above-explained configuration, an electrically insulating paper is exemplified as the electrical insulation sheets 27 and 31 in the present embodiment, but they are not limited to it and may be something else that can electrically insulate the tray 15 from the bus bars 19 or from the electrically conductive plate 29.

As a second embodiment of the present invention, described will be a case where the tray 15 is composed of an electrically nonconductive material such as resin and ceramic. In this case, the electrical insulation sheet 27 in FIG. 5 is not needed. Also the electrical insulation sheet 31 on the side of the smoothing capacitor 11 is not also needed.

Therefore, in the second embodiment, the number of components can be reduced due to the lack of the need for the electrical insulation sheets 27 and 31, and cooling effects with respect to the bus bars 19 and the electrically conductive plate 29 can be enhanced to restrict the temperatures of the bus bars 19 and the inverter 9 from highly increasing more effectively. The temperatures of the bus bars 19 can be restricted from highly increasing more effectively due to the enhancement of the cooling effect with respect to the bus bars 19, and thereby the detection accuracy of the electric currents by the electric current sensor 21 is further improved.

Figure 6:
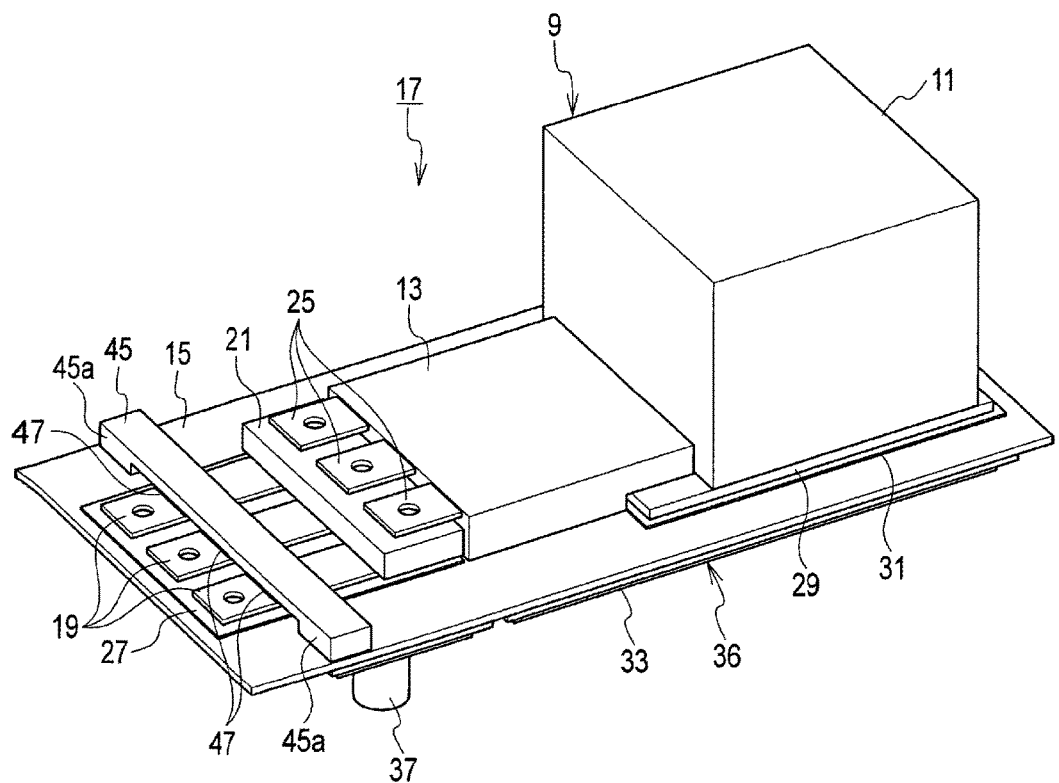
FIG. 6 is a perspective view showing a third embodiment and being equivalent to FIG. 2.

FIG. 6 is a perspective view showing a third embodiment and being equivalent to FIG. 2. In the third embodiment, a metallic member 45 as a heat radiation member is provided above opposite sides of the bus bars 19 to the tray 15 in an electrically insulated state. Specifically, electrical insulation sheets 47 such as electrically insulating papers that provide electrical insulation are interposed between the metallic member 45 composed of an electrically conductive material and the bus bars 19. The electrical insulation sheets 47 are fixed with the metallic member 45 and the bus bars 19 by adhesives, for example.

The metallic member 45 extends along a parallel alignment direction of the three bus bars 19, and includes a protrusion 45*a* at each of its both ends. Lower ends of the protrusions 45*a* are contacted and fixed with a surface of the tray 15 by adhesives, for example.

Figure 7:
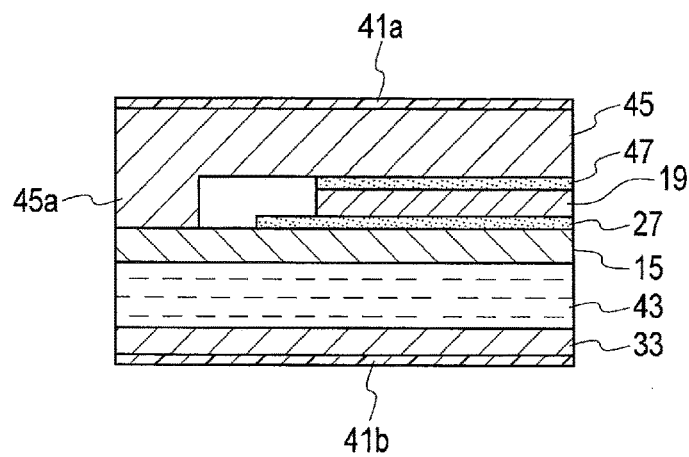
FIG. 7 is a schematically cross-sectional view showing the third embodiment and being equivalent to FIG. 5.

FIG. 7 is a schematically cross-sectional view showing the third embodiment and being equivalent to FIG. 5, and a cross-sectional view when viewing the metallic member 45 from a side of the terminal hole 19*a* of the bus bar 19 on the tray 15. In this case, it takes a structure in which the metallic member 45 and the electrical insulation sheet 47 are further provided between the bus bar 19 and the upper laminated film 41*a* in addition to that in FIG. 5. Note that the electrical insulation sheet(s) 47 may be configured integrally with the electrical insulation sheet 27.

In the third embodiment, the metallic member 45 is cooled by the tray 15 that is cooled by the cooling water 43. Here, the heats of the bus bars 19 are radiated to the metallic member 45 through the electrical insulation sheet 47. Therefore, the bus bars 19 are cooled by the metallic member 45 from their opposite-side surfaces to the tray 15 in addition to being cooled by the tray 15 via the electrical insulation sheet 27. Therefore, the cooling effect of the bus bars 19 is further improved to restrict, more effectively, the temperatures of the bus bars 19 from highly increasing, and the detection accuracy of the electric currents by the electric current sensor 21 is further improved.

In the third embodiment, the metallic member 45 is composed of an electrically conductive material, and the electrical insulation sheets 47 are provided between the metallic member 45 and the bus bars 19. Therefore, the cooling of the bus bars 19 can be ensured while electrically insulating the metallic member 45 from the bus bars 19 by the electrical insulation sheets 47.

As a fourth embodiment of the present invention, resin or ceramic composed of an electrically nonconductive material may be used instead of the metallic member 45 as the heat radiation member. In this case, the electrical insulation sheets 47 in FIG. 7 are not needed. According to this, the number of the components can be reduced and the cooling effect of the bus bars 19 can be enhanced further.

Note that the protrusions 45*a* of the metallic member 45 may be in a state where they are not contacted with the tray 15 and distanced from it. In this case, the metallic member 45 is not cooled by the tray 15, but the metallic member 45 may be cooled by another cooling member that is not shown in the drawings. In addition, the metallic member 45 may be cooled by ambient air, i.e. air-cooled by expanding the metallic member 45 to outer sides without contacting it with the tray 15.

In addition, heat radiation grease may be pasted between the tray 15 and the protrusions 45*a* of the metallic member 45, between the metallic member 45 and the electrical insulation sheets 47, and between the electrical insulation sheets 47 and the bus bars 19. The heat radiation grease is thermally conductive grease having superior heat radiation characteristics, and can reduce thermal resistances to improve heat radiation effects by being pasted on a thermally conductive surface(s)

Figure 8:
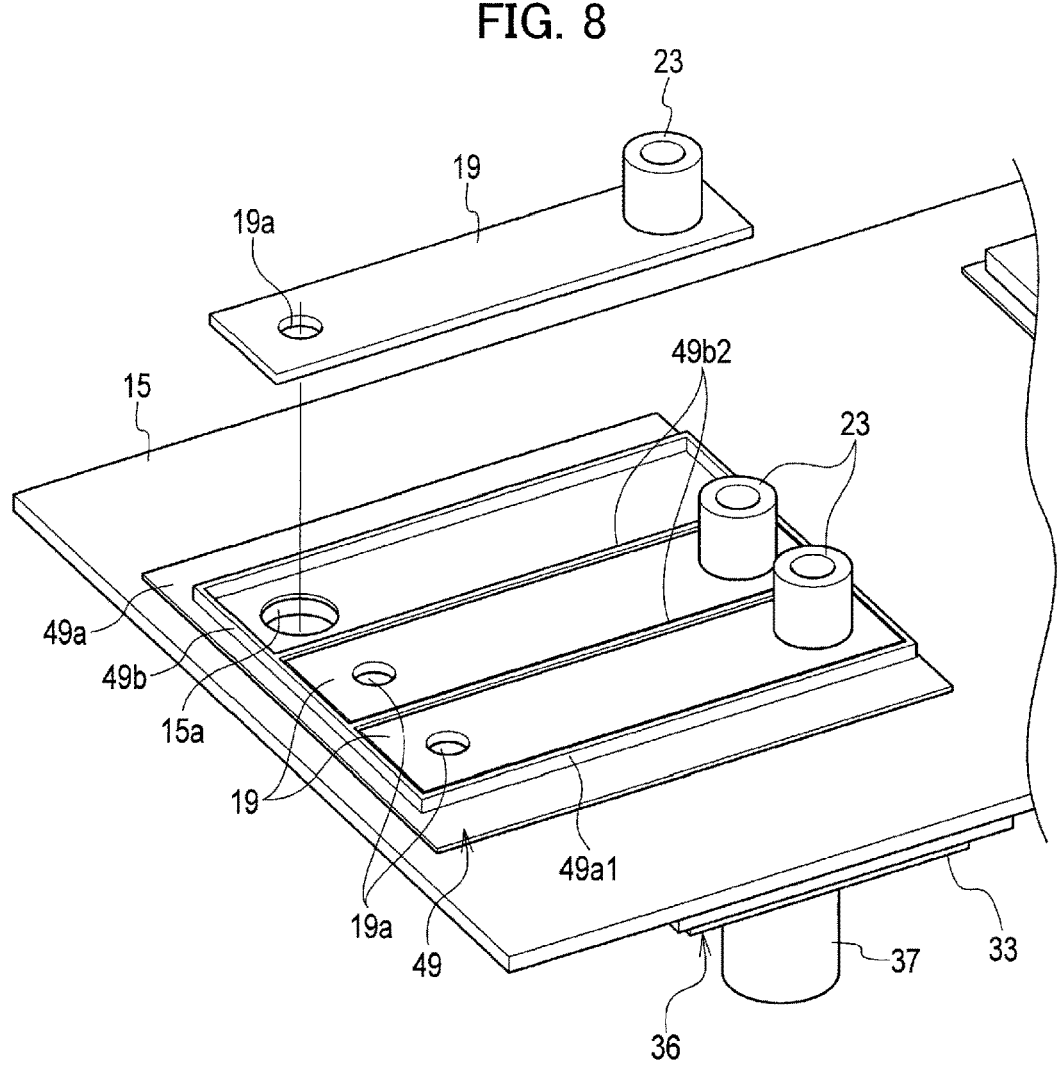
FIG. 8 is an exploded perspective view of a portion including a bus bar according to a fifth embodiment of the present invention.
Figure 9:
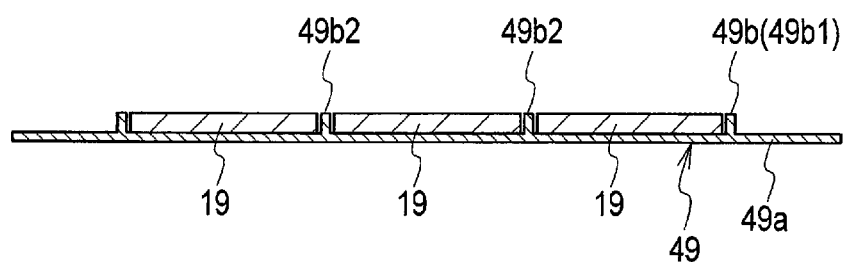
FIG. 9 is a cross-sectional view of a partitioned electrical insulation sheet, including bus bars, in the fifth embodiment.

FIG. 8 and FIG. 9 show a fifth embodiment. In the fifth embodiment, a partitioned electrical insulation sheet 49 is used instead of the electrical insulation sheet 27 in the first embodiment shown in FIG. 3. Other configurations are identical to those in the first embodiment.

The partitioned electrical insulation sheet 49 includes vertical walls 49*b* on a flat portion 49*a* having a flat planar shape. The vertical walls 49*b* include outer wall 49*a*1 that surrounds a whole of the three bus bars 19 and partition walls 49*b*2 each of which is located between the bus bars 19 adjacent to each other to separate the adjacent bus bars 19 from each other. As shown in FIG. 9, a height of the outer wall 49*a*1 and the partition walls 49*b*2 from the flat portion 49*a* is almost identical to a thickness of the bus bar(s) 19.

The three bus bars 19 are accommodated in three areas surrounded by the outer wall 49*a*1 and the partition walls 49*b*2. According to this, the three bus bars 19 are arranged in an aligned state on the partitioned electrical insulation sheet 49, and the adjacent ones of them are electrically insulated from each other by the partition wall(s) 49*b*2.

In the fifth embodiment, the plural bus bars 19 are provided and the partition wall 49*b*2 that is an electrically insulating member is provided between the adjacent bus bars 19. Therefore, the plural bus bars 19 can be electrically insulated from each other with certainty.

Since the bus bars 19 adjacent to each other can be electrically insulated from each other by the partition wall 49*b*2, they can be arranged on the tray 15 so as to make a gap between them narrower. According to this, a mount area on the tray 15 required for the bus bars 19 can be made small, and thereby down-sizing of an entire of the inverter module 17 and also down-sizing of an entire of a motor apparatus as the electrical rotating apparatus can be achieved.

A contact area of the bus bars 19 with the partitioned electrical insulation sheet 49 is made larger by contacting their side surfaces with the vertical walls 49*b* than that in the case where only their bottom surfaces are contacted with the electrical insulation sheet 27 as shown in FIG. 3. Therefore, the heats of the bus bars 19 can be radiated effectively to the tray 15 via the partitioned electrical insulation sheet 49. In addition, the bus bars 19 are accommodated in the three areas surrounded by the outer wall 49*a*1 and the partition walls 49*b*2 in a state where they are aligned therein, and thereby works for installing them on the tray 15 can be easily done.

Figure 10:
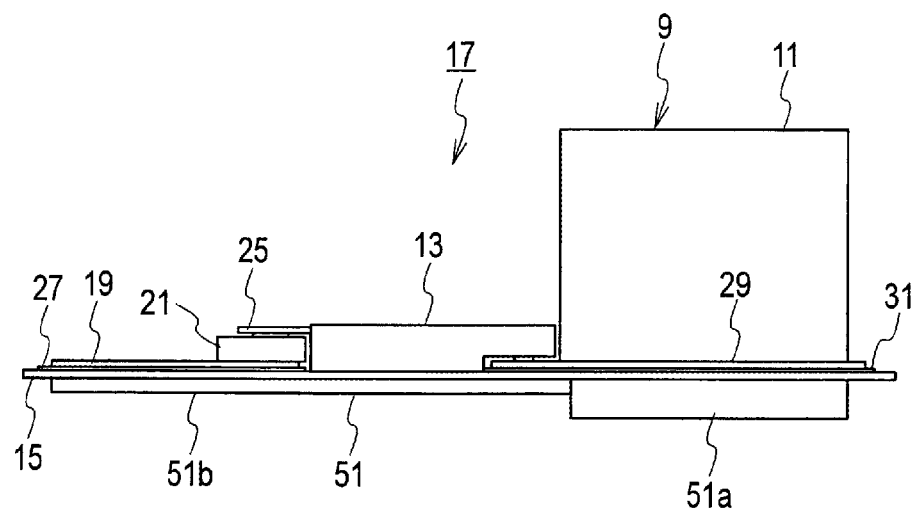
FIG. 10 is a side view of an inverter module according to a sixth embodiment of the present invention.

FIG. 10 shows a sixth embodiment. In the sixth embodiment, a heat pipe(s) 51 is attached to the bottom surface of the tray 15 instead of the cooler 36 including the water channel forming member 33 in FIG. 4. The heat pipe 51 includes a condensing portion 51*a* on a side in association with the smoothing capacitor 11, and an evaporating portion 51*b* on a side in association with the bus bars 19 and the power module 13 that are especially needed to be cooled.

The power module 13 and the bus bars 19 can be cooled similarly to the case of providing the cooler 36 by radiating their heats to the evaporating portion 51*b* of the heat pipe 51.

The embodiments of the present invention are described above, but these embodiments are mere examples described to make the present invention easily understood, and the present invention is not limited to the above embodiments. The technical scope of the present invention is not limited to specific technical matters disclosed in the above embodiments, and includes modifications, changes, alternative techniques easily derived from them.

For example, in the case where the tray 15 is made of metal that is composed of an electrically conductive material, only its portions contacting with the bus bars 19 may be configured of an electrically insulating member.

In addition, the present invention can be applied not only to the inverter 9 but also to a DC-DC converter as the electric power conversion device, and the present invention can be applied to not only to the motor 8 but also to a generator as an electrical rotating device. Further, a Peltier element(s) may be used as the cooling portion.

INDUSTRIAL APPLICABILITY

The present invention is applied to a mechanically-electrically integrated electrical rotating apparatus in which an electrical rotating device and an electric power conversion device are integrally housed in its housing.

REFERENCE SIGNS LIST

1 housing
8 motor (electrical rotating device)
9 inverter (electric power conversion device)
13 power module (electronic component)
15 tray (attachment member)
19 bus bar (electrically conductive connecting member)
27, 47 electrical insulation sheet (electrically insulating member)
36 cooler (cooling portion)
45 metallic member (heat radiation member)
49*b*2 partition wall of partitioned electrical insulation sheet (electrically insulating member)
51 heat pipe (cooling portion)

The invention claimed is:

1. A mechanically-electrically integrated electrical rotating apparatus comprising:
   an electrical rotating device;
   an inverter connected with the electrical rotating device, the inverter comprising a power module;
   a housing that integrally houses the electrical rotating device and the inverter;
   an attachment member attached to the housing, the electrical rotating device being provided on a first side of the attachment member and the inverter being attached to a second side of the attachment member opposite to the first side;
   at least one bus bar attached to the second side of the attachment member, and connected with the power module of the inverter and with the electrical rotating device;
   a first electrically insulating member provided between the attachment member and the at least one bus bar such that the at least one bus bar is electrically insulated from the attachment member; and
   a cooling portion that is attached to the first side of the attachment member and configured to cool the power module and the at least one bus bar, wherein
   the attachment member is composed of an electrically conductive material.

2. The mechanically-electrically integrated electrical rotating apparatus according to claim 1, further comprising an opening portion provided at at least part of the cooling portion on a side of the attachment member,
   wherein the attachment member is provided at the opening portion.

3. The mechanically-electrically integrated electrical rotating apparatus according to claim 1, further comprising a heat radiation member provided on a side of the at least one bus bar opposite to a side of the at least one bus bar attached to the attachment member, wherein the heat radiation member is electrically insulated from the at least one bus bar.

4. The mechanically-electrically integrated electrical rotating apparatus according to claim 3, further comprising:
a second electrically insulating member provided between the heat radiation member and the at least one bus bar,
wherein the heat radiation member is composed of an electrically conductive material.

5. The mechanically-electrically integrated electrical rotating apparatus according to claim 3, wherein
the heat radiation member is composed of an electrically nonconductive material.

6. The mechanically-electrically integrated electrical rotating apparatus according to claim 1, wherein
the at least one bus bar comprises a plurality of bus bars, and
a third electrically insulating member is provided between each adjacent two of the plurality of bus bars.

7. The mechanically-electrically integrated electrical rotating apparatus according to claim 1, wherein
the cooling portion comprises a cooler provided with a cooling water channel, and
the at least one bus bar is located proximate to an upstream position of the cooling water channel with respect to a flow of a cooling water in the cooling water channel, and the power module is located proximate to a downstream position of the cooling water channel with respect to the flow of the cooling water in the cooling water channel.

8. A mechanically-electrically integrated electrical rotating apparatus comprising:
an electrical rotating device;
an electric power conversion device connected with the electrical rotating device, the electric power conversion device comprising an electronic component;
a housing that integrally houses the electrical rotating device and the electric power conversion device;
an attachment member attached to the housing, the electrical rotating device being provided on a first side of the attachment member and the electric power conversion device being attached to a second side of the attachment member opposite to the first side;
an electrically conductive connecting member attached to the second side of the attachment member, and connected with the electronic component of the electric power conversion device and with the electrical rotating device;
a cooling portion that is attached to the first side of the attachment member and configured to cool the electronic component and the electrically conductive connecting member;
a heat radiation member provided on a side of the electrically conductive connecting member opposite to a side of the electrically conductive connecting member attached to the attachment member; and
an electrically insulating member provided between the heat radiation member and the electrically conductive connecting member,
wherein the heat radiation member is composed of an electrically conductive material, and
wherein the electrically conductive connecting member is electrically insulated from the attachment member.

9. A mechanically-electrically integrated electrical rotating apparatus comprising:
a motor;
an inverter connected with the motor, the inverter comprising a power module;
a housing that integrally houses the motor and inverter;
a tray attached to the housing, the motor being provided on a first side of the tray and the inverter being attached to a second side of the tray opposite to the first side;
at least one bus bar attached to the second side of the tray and connected with the power module of the inverter and with the motor;
a first electrical insulation sheet provided between the tray and the at least one bus bar such that the at least one bus bar is electrically insulated from the tray; and
a cooler attached to the first side of the tray and configured to cool the power module and the at least one bus bar,
wherein the tray is composed of an electrically conductive material.

10. The mechanically-electrically integrated electrical rotating apparatus according to claim 9, further comprising an opening portion provided at at least part of the cooler on a side of the tray,
wherein the tray is provided at the opening portion.

11. The mechanically-electrically integrated electrical rotating apparatus according to claim 9, further comprising a heat radiation member provided on a side of the at least one bus bar opposite to a side of the at least one bus bar attached to the tray.

12. The mechanically-electrically integrated electrical rotating apparatus according to claim 11, further comprising:
a second electrical insulation sheet is provided between the heat radiation member and the at least one bus bar such that the heat radiation member is electrically insulated from the at least one bus bar,
wherein the heat radiation member is composed of an electrically conductive material.

13. The mechanically-electrically integrated electrical rotating apparatus according to claim 11, wherein
the heat radiation member is composed of an electrically nonconductive material.

14. The mechanically-electrically integrated electrical rotating apparatus according to claim 9, further comprising:
a partitioned electrical insulation sheet comprising a plurality of partitions,
wherein the at least one bus bar comprises a plurality of bus bars, and
wherein one of the plurality of partitions of the partitioned electrical insulation sheet is provided between each adjacent two of the plurality of bus bars.

15. The mechanically-electrically integrated electrical rotating apparatus according to claim 9, wherein
the cooler comprises a cooling water channel, and
the at least one bus bar is located proximate to an upstream position of the cooling water channel with respect to a flow of a cooling water in the cooling water channel, and the power module is located proximate to a downstream position of the cooling water channel with respect to the flow of the cooling water in the cooling water channel.

* * * * *